United States Patent
Yu et al.

(10) Patent No.: US 12,180,668 B2
(45) Date of Patent: Dec. 31, 2024

(54) METHODS FOR PREDICTING A STABILITY OF A STEEL CYLINDER AGAINST TILT

(71) Applicants: TIANJIN PORT ENGINEERING INSTITUTE CO., LTD. OF CCCC FIRST HARBOR ENGINEERING CO., LTD., Tianjin (CN); CCCC FIRST HARBOR ENGINEERING CO., LTD., Tianjin (CN); TIANJIN PORT ENGINEERING QUALITY TESTING CENTER CO., LTD., Tianjin (CN)

(72) Inventors: Changyi Yu, Tianjin (CN); Wei Pan, Tianjin (CN); Yiyong Li, Tianjin (CN); Naishou Zhang, Tianjin (CN); Yonghua Cao, Tianjin (CN); Aimin Liu, Tianjin (CN); Changxi Yue, Tianjin (CN); Xiaoqiang Kou, Tianjin (CN); Zhijun Chen, Tianjin (CN); Binbin Xu, Tianjin (CN)

(73) Assignees: TIANJIN PORT ENGINEERING INSTITUTE CO., LTD. OF CCCC FIRST HARBOR ENGINEERING CO., LTD., Tianjin (CN); CCCC FIRST HARBOR ENGINEERING CO., LTD., Tianjin (CN); TIANJIN PORT ENGINEERING QUALITY TESTING CENTER CO., LTD., Tianjin (CN)

( * ) Notice: Subject to any disclaimer, the term of this patent is extended or adjusted under 35 U.S.C. 154(b) by 0 days.

(21) Appl. No.: 18/644,065

(22) Filed: Apr. 23, 2024

(65) Prior Publication Data
US 2024/0279899 A1 Aug. 22, 2024

Related U.S. Application Data

(63) Continuation-in-part of application No. PCT/CN2023/085011, filed on Mar. 30, 2023.

(30) Foreign Application Priority Data

Apr. 15, 2022 (CN) .......................... 202210396125.5

(51) Int. Cl.
*E02D 33/00* (2006.01)
*G06F 30/27* (2020.01)
(Continued)

(52) U.S. Cl.
CPC ............. *E02D 33/00* (2013.01); *G06F 30/27* (2020.01); *G06F 2119/02* (2020.01); *G06F 2119/14* (2020.01)

(58) Field of Classification Search
CPC ..... E02D 33/00; G06F 30/27; G06F 2119/14; G06F 2119/02
See application file for complete search history.

(56) References Cited

FOREIGN PATENT DOCUMENTS

| CN | 111859660 A | 10/2020 |
|----|-------------|---------|
| CN | 113806852 A | 12/2021 |

(Continued)

OTHER PUBLICATIONS

First Office Action in Chinese Application No. 202210396125.5 mailed on May 23, 2023, 10 pages.
(Continued)

*Primary Examiner* — Tara Mayo
*Assistant Examiner* — Tara Mayo-Pinnock
(74) *Attorney, Agent, or Firm* — METIS IP LLC

(57) ABSTRACT

Method for predicting a stability of a steel cylinder including: in response to the steel cylinder tilting toward a seaward side at an arbitrary rotation point, obtaining a safety factor for the steel cylinder tilting toward the seaward side by determining an anti-tilt moment and a tilt moment when the steel cylinder is tilted to the seaward side; under a same rotation point, in response to determining that the steel
(Continued)

cylinder is rotated toward a land side, determining the safety factor for the steel cylinder tilting toward the land side; taking a smaller safety factor as the safety factor under the rotation point; re-selecting a new rotation point, determining a safety factor corresponding to the new rotation point, and taking a safety factor with a smallest value among all rotation points as a final safety factor; and generating, based on the final safety factor, an anti-tilt instruction.

4 Claims, 6 Drawing Sheets

(51) Int. Cl.
*G06F 119/02* (2020.01)
*G06F 119/14* (2020.01)

(56) References Cited

FOREIGN PATENT DOCUMENTS

| CN | 114004086 A | 2/2022 |
| CN | 114809125 A | 7/2022 |
| CN | 115288213 A | 11/2022 |
| WO | 2020072015 A1 | 4/2020 |
| WO | 2022032994 A1 | 2/2022 |

OTHER PUBLICATIONS

Notification to Grant Patent Right for Invention in Chinese Application No. 202210396125.5 mailed on Jul. 21, 2023, 6 pages.
International Search Report in PCT/CN2023/085011 mailed on Jul. 14, 2023, 6 pages.
Written Opinion in PCT/CN2023/085011 mailed on Jul. 14, 2023, 6 pages.

US 12,180,668 B2

METHODS FOR PREDICTING A STABILITY OF A STEEL CYLINDER AGAINST TILT

CROSS-REFERENCE TO RELATED APPLICATION

This application is a Continuation in part of International Application No. PCT/CN2023/085011, filled on Mar. 30, 2023, which claims priority to Chinese application No. 202210396125.5, filed Apr. 15, 2022, the entire contents of which are incorporated herein by reference.

TECHNICAL FIELD

The present disclosure relates to the technical field of calculating a stability of a steel cylinder at sea or on water, and in particular, relates to a method for predicting a stability of a steel cylinder against tilt.

BACKGROUND

Steel cylinders used in construction of islands and other coastal projects on soft soil foundations have been successfully applied in large-scale projects such as Guangzhou Panyu revetment, Hong Kong-Zhuhai-Macao Bridge Link Island, Shenzhen-Zhongshan Corridor Link Island, Hong Kong Airport, etc. However, several falling damages have occurred in the application, suggesting imperfections in a calculation method for stability design.

Currently, a calculation method for stability of a steel cylinder against tilt may mainly include a gravity type structural stability method, a friction resistance method, an anchorless sheet pile stability method, a horizontal bearing capacity method for a suction barrel foundation, a cylinder limit displacement control method, etc. The gravity type structural stability method and the cylinder limit displacement control method do not conform to an actual engineering when the calculation is performed under an extreme working condition. The horizontal bearing capacity method for the suction barrel foundation may not consider a stability of backfill soil. A difference between the friction resistance method and the anchorless sheet pile stability method is that rotation points for moment balance are different. It may be known from actual measurements and other studies that a rotation point of the steel cylinder in use may not be necessarily on a centerline, and may be on somewhere else.

Therefore, it is desirable to provide a method for predicting a stability of a steel cylinder against tilt, which is compatible with a variety of working conditions and performed under arbitrary rotation points.

SUMMARY

One or more embodiments of the present disclosure provide a method for predicting a stability of a steel cylinder against tilt performed based on a processor. One or more intermediate calculation results may be stored in a corresponding memory partition during the performance of the method. In response to the determining that the processor requires to use the one or more intermediate calculation results when performing one or more steps of the method, the processor needs to use the one or more intermediate computation results, the processor may be configured to retrieve the one or more intermediate calculation results from the corresponding memory partition, the method including the following steps.

Step 1, dynamically obtaining water level line information through a water level sensor, and obtaining soil layer information and external load data of burial environment of the steel cylinder through an input device. The soil layer information includes a thickness $h_i$ of a soil layer, a density $\gamma_i$ of the soil layer, a cohesive force $C_i$ of the soil layer, a friction angle $\varphi_i$ of the soil layer, and a friction coefficient $\delta_i$ between a soil body and the steel cylinder, wherein i denotes an ith soil layer.

Step 2, in response to determining that the steel cylinder is tilted towards a seaward side, assuming that a coordinate of a rotation point O at which the steel cylinder is tilted is $(R_{xi}, R_{yi})$, then a soil body outside the steel cylinder at a land side above the rotation point O and a soil body outside the steel cylinder at the seaward side below the rotation point O, may be active soil pressures Pa1 and Pa2 respectively, and a soil body outside the steel cylinder at the land side below the rotation point O and a soil body outside the steel cylinder at the seaward side above the rotation point O, may be passive soil pressures Pp1 and Pp2, respectively.

In response to determining that a burial soil of the steel cylinder is cohesionless soil and a slope surface of filled soil at the land side is horizontal, determining the active soil pressures and the passive soil pressures outside the steel cylinder by using Rankin theory.

Step 3: determining a filler pressure inside the steel cylinder, including:

3.1: dividing an interior of the steel cylinder into three sections from top to bottom, the three sections including an AB section, a BC section, and a CD section, respectively.

A height of the AB section may be denoted as:

$$h_1 = D_0 \cdot \tan\left(45 + \frac{\varphi}{2} - \delta\right).$$

A height of the CD section may be denoted as:

$$h_3 = D_0 \cdot \tan\left(45 - \frac{\varphi}{2}\right).$$

A height of the BC section may be denoted as: $h_2 = H - h_1 - h_3$.

$\varphi$ denotes a friction angle of a filler inside the steel cylinder, $\delta$ denotes a friction angle between the steel cylinder and the filler, $D_0$ denotes a diameter of the steel cylinder, and H denotes a height of the steel cylinder.

3.2: determining a filler pressure of the section AB:

A vertical pressure $\sigma_y$ of the filler inside the steel cylinder is denoted as $\sigma_y = \gamma A m + q_0 e^{-y/A}$ $$A = \frac{D_0}{4K}$$

$$K = \lambda_0 \tan(\delta)$$

wherein $\gamma$ denotes a volume weight (kN/m³) of the filler inside the steel cylinder, $m = 1 - e^{-y/A}$, y denotes a calculated depth (m), e denotes a natural logarithm, $q_0$ denotes an external load, A denotes a parameter to be determined, and;

$$\lambda_0 = \frac{1}{1 + 2\tan\varphi\tan\delta + 2\sqrt{(\tan^2\varphi + 1)(\tan\varphi\tan\delta - \tan^2\delta)}},$$

wherein $\lambda_0$ denotes a thrust coefficient at a side of the filler.

A horizontal pressure $\sigma_x$ of the filler against an inner wall of the AB section of the steel cylinder may be denoted as $\sigma_x=\lambda_0\sigma_y$.

3.3: determining a filler pressure of the BC section:

The filler pressure of the BC section may be considered to be equal pressure, a filler pressure $\sigma_{Bx}$ at a point B may be calculated according to the formula $\sigma_x=\lambda_0\sigma_y$, in step 3.2, and a filler pressure at another position of the BC section may be equal to the filler pressure $\sigma_{Bx}$ at the point B.

3.4: determining filler pressure of the CD section:

Determining filler pressures at a point C and a point D, and obtaining a linear formular for a variation of the filler pressure of the CD section with a depth for the CD section.

The filler pressure at the point C may be equal to the filler pressure $\sigma_{Bx}$ at the point B.

The filler pressure at the point D may be calculated using the following formula: $\sigma_{Dx}=\lambda_0(\sigma_{mid}-\sigma_x)$, wherein $\sigma_{mid}$ denotes an average pressure at a bottom of the steel cylinder.

Step 4: determining an external friction t2 and an internal friction t1 of the steel cylinder when the steel cylinder is tilted to the seaward side, respectively, including:

4.1: determining a friction between the soil layer and an exterior of the steel cylinder.

A friction between the soil layer i and the exterior of the steel cylinder may be denoted as $E_{yi}=\tan(\delta_i)\cdot E_{axi}$ or $E_{yi}=\tan(\delta_i)\cdot E_{pxi}$.

The above formula depends on whether the soil layer i is involved in an active soil pressure calculation or a passive soil pressure calculation, and in response to determining that the soil layer i is involved in the active soil pressure calculation, $E_{yi}=\tan(\delta_i)-E_{axi}$, and in response to determining that the soil layer i is involved in the passive soil pressure calculation, $E_{yi}=\tan(\delta_i)-E_{pxi}$.

4.2: determining a friction between the filler and the interior of the steel cylinder:

For the interior of the steel cylinder, a friction that the AB section is subjected to may be denoted as $E_{yt1AB}\tan(\delta)\cdot\sigma_{Bx}\cdot h_1\cdot 0.5$.

For the interior of the steel cylinder, a friction that the BC section is subjected to may be denoted as $E_{yt1BC}=\tan(\delta)\cdot\sigma_{Cx}\cdot h_2$.

For the interior of the steel cylinder, a friction that the CD section is subjected to may be denoted as $E_{yt1CD}=\tan(\delta)\cdot(\sigma_{Cx}+\sigma_{Dx})\cdot h_3\cdot 0.5$.

Step 5: determining a vertical reaction force and a horizontal resistance force of a foundation bed against the steel cylinder when the steel cylinder is tilted toward the seaward side, respectively.

Step 6: determining an anti-tilt moment $M_r$ and a tilt moment $M_s$ when the steel cylinder is tilted to the seaward side.

$$M_r = P_{p1}*|y_{p1}-R_{yi}| + P_{p2}*|y_{p2}-R_{yi}| + \sum_{i=1}^{N}E_{yi}*|x_i-R_{xi}| +$$

$$(E_{yt1AB}+E_{yt1BC}+E_{yt1CD})*D_0/2 + q*L_q*\frac{L_q}{2} + F*|y_F-R_{yi}|$$

$$M_s = P_{a1}*|y_{a1}-R_{yi}| + P_{a2}*|y_{a2}-R_{yi}|$$

wherein $P_{p1}$ denotes a resultant force of the passive soil pressures at the land side, $y_{p1}$ denotes a y-coordinate of $P_{p1}$, $P_{p2}$ denotes a resultant force of the passive soil pressures at the seaward side, $y_{p2}$ denotes a y-coordinate of $P_{p2}$, N denotes a count of soil layers outside a cylinder body, $x_i$ denotes an x-coordinate of where $E_{yi}$ is located, q denotes an average pressure of the vertical reaction force of the foundation bed against the steel cylinder, $L_q$ denotes a distance from the rotation point to a tilted side, $y_F$ denotes a y-coordinate of the horizontal resistance force F of the foundation bed against the steel cylinder, $P_{a1}$ denotes a resultant force of the active soil pressures at the land side, $P_{a2}$ denotes a resultant force of the active soil pressures at the seaward side, $y_{a1}$ denotes a y-coordinate of $P_{a1}$, and $y_{a2}$ denotes a y-coordinate of $P_{a2}$.

The active soil pressures on the exterior of the steel cylinder may provide the tilt moment, the passive soil pressures, the vertical reaction force of the foundation bed against the steel cylinder, the horizontal resistance force of the foundation bed against the steel cylinder, the internal friction of the steel cylinder, and the external friction of the steel cylinder may provide the anti-tilt moment, and the external load may be used to calculate and provide, according to a moment direction, the anti-tilt moment or the tilt moment.

Step 7: determining a safety factor Kl for the steel cylinder tilting toward the seaward side, wherein $$Kl = \frac{M_r}{M_s}.$$

Step 8: at the same rotation point O, in response to determining that the steel cylinder rotates toward the land side, the soil body outside the steel cylinder at the seaward side above the rotation point O, and the soil body outside the steel cylinder at the land side below the rotation point O, are active soil pressures Pa1' and Pa2', respectively.

The soil body outside the steel cylinder at the seaward side below the rotation point O, and the soil body outside the steel cylinder at the land side above the rotation point O, are passive soil pressures Pp1' and Pp2', respectively.

Under a condition that the steel cylinder rotates to the land side the active soil pressures, the passive soil pressures, the vertical reaction force of the foundation bed against the steel cylinder, the horizontal resistance force of the foundation bed against the steel cylinder, the internal friction of the steel cylinder, and the external friction of the steel cylinder are re-determined according to steps 2-7 above.

The anti-tilt moment and the tilt moment may be determined under a condition that the steel cylinder is tilted toward the land side, and a safety factor Kr for of the steel cylinder tilting toward the land side may be determined.

Step 9: comparing $K_l$ and Kr, and taking a smaller value of $K_l$ and Kr as a safety factor $F_i$ below the rotation point O.

Step 10: re-selecting a new rotation point, determining a safety factor corresponding to the new rotation point according to steps 2 to 9 above, and taking a safety factor with a smallest value among all rotation points as a final safety factor $F_{min}$ under a working condition.

Step 11: determining a stability monitoring parameter based on the final safety factor $F_{min}$, and generating an anti-tilt instruction, the anti-tilt instruction including an early warning instruction and a reinforcing parameter instruction; sending the stability monitoring parameter to a stability monitoring device, sending the early warning instruction to a playback device, and sending the reinforcing parameter instruction to a reinforcing device corresponding to a weak point.

Determining the reinforcing parameter instruction may include: in response to determining that the final safety factor $F_{min}$ is lower than a preset safety value, determining, based on rotation point information corresponding to the final safety factor $F_{min}$ and load data of the steel cylinder, the weak point and the reinforcing parameter through an anti-tilt model, and taking the weak point and the reinforcing parameter as the reinforcing parameter instruction, the anti-tilt model being a machine learning model.

In the above technical solution, in step 2, when the burial soil of the steel cylinder is cohesionless soil and a slope surface of filled soil at the land side is horizontal, steps of determining the active soil pressures and the passive soil pressures outside the steel cylinder by using Rankin theory may be as follows:

2.1: determining the active soil pressure $$e_{axi1} = K_{axi} \sum_{1}^{i-1} \gamma_i h_i$$

$$e_{axi2} = K_{axi} \left( \sum_{1}^{i-1} \gamma_i h_i + \gamma_i h_i \right)$$

$$K_{axi} = \tan^2\left(45 - \frac{\varphi_i}{2}\right)$$

$$E_{axi} = \frac{e_{axi1} + e_{axi2}}{2} h_i$$

wherein $\varphi_i$ denotes the friction angle of the soil layer i, $h_i$ denotes the thickness of the soil layer i, $\gamma_i$ denotes a volume weight of the soil layer i, a natural volume weight may be used for soil above a water level, and a floating volume weight may be used for soil below the water level, $K_{axi}$ denotes an active soil pressure coefficient of the soil layer i, $e_{axi1}$ denotes an active soil pressure at a top of the soil layer i, $e_{axi2}$ denotes an active soil pressure at a bottom of the soil layer i, $E_{axi}$ denotes a resultant force of the active soil pressures of the soil layer i, a sum of resultant forces of the active soil pressures $E_{axi}$ of all soil layers i outside the steel cylinder at the land side above the rotation point O may be the active soil pressure Pa1, and a sum of resultant forces of the active soil pressures $E_{axi}$ of all the soil layers i outside the steel cylinder at the seaward side below the rotation point O may be the active soil pressure Pa2.

2.2: determining the passive soil pressure $$e_{pxi1} = K_{pxi} \sum_{1}^{i-1} \gamma_i h_i$$

$$e_{pxi2} = K_{pxi} \left( \sum_{1}^{i-1} \gamma_i h_i + \gamma_i h_i \right)$$

$$K_{pxi} = \tan^2\left(45 + \frac{\varphi_i}{2}\right)$$

$$E_{pxi} = \frac{e_{pxi1} + e_{pxi2}}{2} h_i$$

wherein $K_{pxi}$ denotes a passive soil pressure coefficient of the soil layer i, $e_{pxi1}$ denotes a passive soil pressure at the top of the soil layer i, $e_{pxi2}$ denotes a passive soil pressure at the bottom of the soil layer i, $E_{pxi}$ denotes a resultant force of the passive soil pressures of the soil layer i, a sum of resultant forces of the passive soil pressures $E_{pxi}$ of all the soil layers i outside the steel cylinder at the land side below the rotation point O may be the passive soil pressure Pp1, and a sum of resultant forces of the passive soil pressures $E_{pxi}$ of all the soil layers i outside the steel cylinder at the seaward side above the rotation point O may be the passive soil pressure Pp2.

In the above technical solution, in step 3.2, taking a variation of the filler pressure of the AB section as a linear variation, and calculating the filler pressure $\sigma_{Bx}$ at the point B according to a formula $\sigma_x = \lambda_0 \sigma_y$, wherein a filler pressure at a point A is set to be 0.

In the above technical solution, step 5 may include:

5.1: the vertical reaction force of the foundation bed against the steel cylinder.

The average pressure of the vertical reaction force of the foundation bed against the steel cylinder may be denoted as $q = 9 \cdot C_u$, where $C_u$ denotes an undrained shear strength of a foundation soil body, the vertical reaction force of the foundation bed against the steel cylinder may be denoted as $F_q = q \ast L_q$, where $L_q$ denotes a distance $L_q$ between the rotation point and the tilt side, and $L_q$ may be calculated based on coordinates of the rotation point and the diameter of the steel cylinder.

5.2: the horizontal resistance force of the foundation bed against the steel cylinder.

The horizontal resistance force of the foundation bed against the steel cylinder may be denoted as $F = \pi/4 \cdot D_0 \cdot D_0 \cdot C_u$.

BRIEF DESCRIPTION OF THE DRAWINGS

The present disclosure is further illustrated by way of exemplary embodiments, which will be described in detail by means of the accompanying drawings. These embodiments are not limiting, and in these embodiments, the same numbering denotes the same structure, wherein.

DETAILED DESCRIPTION

Figure 1:
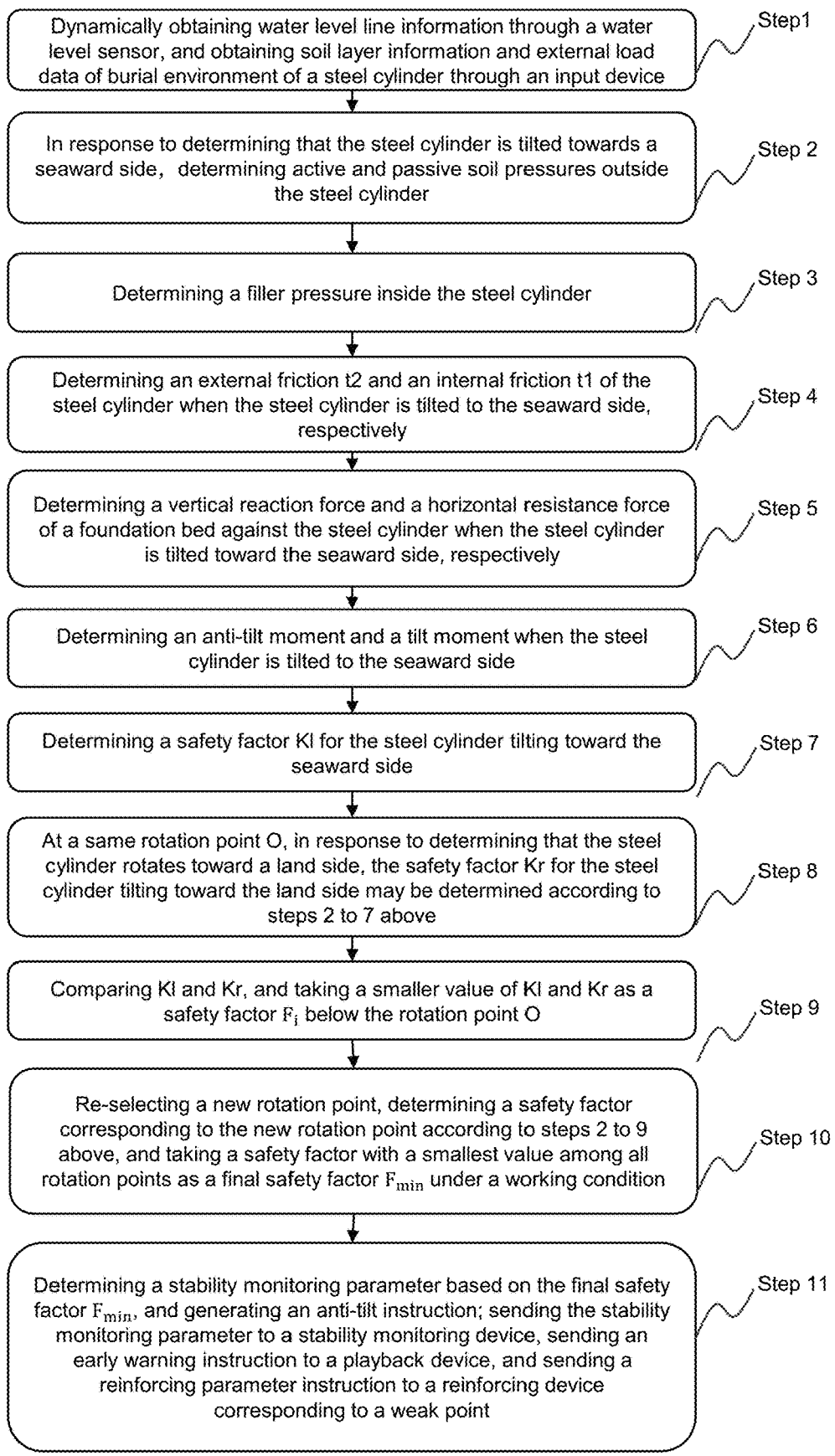
FIG. 1 is a flowchart illustrating an exemplary method for predicting a stability of a steel cylinder against tilt according to some embodiments of the present disclosure.

To more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for those skilled in the art to apply the present disclosure to other similar scenarios according to these drawings without creative labor. The present disclosure may be applied to other similar scenarios based on these drawings without creative labor. Unless obviously obtained from the context or the context illustrates otherwise, the same numeral in the drawings refers to the same structure or operation.

It should be understood that the terms "system", "device", "unit" and/or "module" as used herein is a way to distinguish between different components, elements, parts, sections, or assemblies at different levels. However, the words may be replaced by other expressions if other words accomplish the same purpose.

As shown in the present disclosure and the claims, unless the context clearly suggests an exception, the words "one", "a", "an", and/or "the" do not refer specifically to the singular, but may also include the plural. Generally, the terms "including" and "comprising" suggest only the inclusion of clearly identified operations and elements. In general, the terms "including" and "comprising" only suggest the inclusion of explicitly identified operations and elements that do not constitute an exclusive list, and the method or apparatus may also include other operations or elements.

Flowcharts are used in the present disclosure to illustrate operation performed by a system according to embodiments of the present disclosure. It should be appreciated that the preceding or following operation are not necessarily performed in an exact sequence. Instead, operations may be processed in reverse order or simultaneously. Also, it is possible to add other operation to these processes or remove an operation or operations from them.

Embodiment 1

FIG. 1 is a flowchart illustrating an exemplary method for predicting a stability of a steel cylinder against tilt according to some embodiments of the present disclosure. In some embodiments, an exemplary flow of the method for predicting the stability of the steel cylinder against tilt may be performed based on a processor. As shown in FIG. 1, the steps are as follows:

Step 1, dynamically obtaining water level line information through a water level sensor, and obtaining soil layer information and external load data of burial environment of the steel cylinder through an input device.

Water level line information may be information related to a water level of the environment where the steel cylinder is buried.

In some embodiments, the processor may dynamically obtain the water level line information through the water level sensor. For example, the processor may obtain the water level line information at different time points collected by the water level sensor based on a preset collection frequency.

A water level sensor refers to a device for measuring the water level line information. For example, the water level sensor may include a float water level sensor, a bubble water level sensor, an ultrasonic water level sensor, etc.

Soil layer information refers to information related to a soil layer of the environment where the steel cylinder is buried. In some embodiments, the soil layer information may include soil layer geometry data and soil layer physical data.

Soil layer geometry data refers to data related to a geometric property of the soil layer. For example, the soil layer geometric data may include a thickness of a soil layer $h_i$.

Soil layer physical data refers to data related to a physical property of the soil layer. For example, the soil layer physical data may include a density $\gamma_i$ of the soil layer, a cohesive force $C_i$ of the soil layer, a friction angle $\varphi_i$ of the soil layer, and a friction coefficient $\delta_i$ between a soil body and the steel cylinder, wherein i denotes an ith soil layer.

External load data refers to the external load data of a burial environment of the steel cylinder through an input device.

In some embodiments, the processor may obtain the soil layer information and the external load data of the burial environment of the steel cylinder through an input device. An input device refers to a device or component for inputting the soil layer information and the external load data of the steel cylinder burial environment. For example, the input device may include a keyboard, a touch screen, a voice input system, etc.

Step 2, in response to determining that the steel cylinder is tilted towards a seaward side, determining the active and passive soil pressures outside the steel cylinder.

In some embodiments, the processor may determine that the steel cylinder is tilted toward the seaward side when a resultant force exerted on the steel cylinder points toward the seaward side in a horizontal direction.

An active soil pressure refers to a thrust of the soil body that prompts the steel cylinder to be tilted. A passive soil pressure refers to an opposing force of the soil body that prevents the steel cylinder from being tilted.

A soil body refers to the burial environment of the steel cylinder, which is composed of a variety of soil layers of different properties and varying thicknesses.

Figure 2:
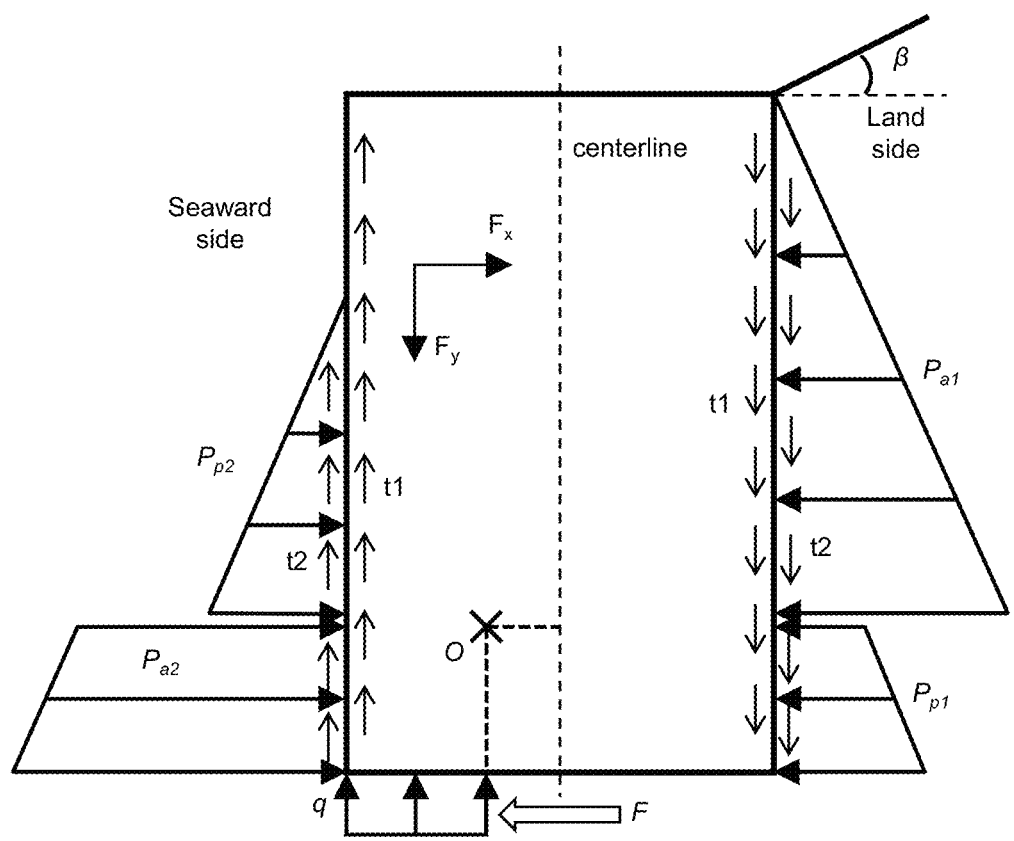
FIG. 2 is a schematic diagram illustrating a force-bearing of a steel cylinder tilting toward a seaward side under a limit state according to some embodiments of the present disclosure.

FIG. 2 is a schematic diagram illustrating a force-bearing of a steel cylinder tilting toward a seaward side under a limit state according to some embodiments of the present disclosure.

As shown in FIG. 2, the steel cylinder may be tilted to the seaward side (i.e., to the left side in FIG. 2), and the processor may set coordinates of a rotation point O at which the steel cylinder is tilted as $(R_{xi}, R_{yi})$.

A rotation point refers to an actual or virtual point at which the steel cylinder rotates when the steel cylinder is tilted or subjected to an external moment.

In some embodiments, the processor may take, based on an evaluation model, a target rotation point with the highest reliability as a current rotation point O. For more descriptions of the evaluation model and the determining of the target rotation point, please refer to FIG. 6 and the related descriptions thereof.

Referring to FIG. 2, the soil body outside the steel cylinder at a land side above the rotation point may be an active soil pressure Pa1, a soil body outside the steel cylinder at the seaward side below the rotation point O may be an active soil pressure Pa2; a soil body outside the steel cylinder at the land side below the rotation point O may be a passive soil pressure Pp1; and a soil body outside the steel cylinder at the seaward side above the rotation point O may be a passive soil pressure Pp2.

In some embodiments, in response to determining that a burial soil of the steel cylinder is cohesionless soil and a slope surface of filled soil at the land side is horizontal (i.e., β=0), the processor may determine the active soil pressures and the passive soil pressures outside the steel cylinder by using Rankin theory.

2.1: determining the active soil pressures $$e_{axi1} = K_{axi} \sum_{1}^{i-1} \gamma_i h_i$$

$$e_{axi2} = K_{axi} \sum_{1}^{i} \gamma_i h_i$$

$$K_{axi} = \tan^2\left(45 - \frac{\phi_i}{2}\right)$$

$$E_{axi} = \frac{e_{axi1} + e_{axi2}}{2} h_i$$

wherein $\phi_i$ denotes a friction angle of the soil layer i, $h_i$ denotes a thickness of the soil layer i, and $\gamma_i$ denotes a volume weight of the soil layer i. A natural volume weight may be used for the soil above the water level line, and a floating volume weight may be used for the soil below the water level line. $K_{axi}$ denotes an active soil pressure coefficient of the soil layer i, $e_{axi1}$ denotes an active soil pressure at a top of the soil layer i, $e_{axi2}$ denotes an active soil pressure at a bottom of the soil layer i, and $E_{axi}$ denotes a resultant force of the active soil pressures of the soil layer i.

In some embodiments, the processor may determine a sum of resultant forces of the active soil pressures $E_{axi}$ of all soil layers i outside the steel cylinder at the land side above the rotation point O as an active soil pressure Pa1. In some embodiments, the processor may determine a sum of resultant forces of the active soil pressures $E_{axi}$ of all the soil layers i outside the steel cylinder at the seaward side below the rotation point O as an active soil pressure Pa2.

2.2: determining the passive soil pressures $$e_{pxi1} = K_{pxi} \sum_{1}^{i-1} \gamma_i h_i$$

$$e_{pxi2} = K_{pxi} \sum_{1}^{i} \gamma_i h_i$$

$$K_{pxi} = \tan^2\left(45 + \frac{\phi_i}{2}\right)$$

$$E_{pxi} = \frac{e_{pxi1} + e_{pxi2}}{2} h_i$$

wherein $K_{pxi}$ denotes a passive soil pressure coefficient of the soil layer i, $e_{pxi1}$ denotes a passive soil pressure at the top of the soil layer i, $e_{pxi2}$ denotes a passive soil pressure at the bottom of the soil layer i, and $E_{pxi}$ denotes a resultant force of the passive soil pressures of the soil layer i.

In some embodiments, the processor may determine a sum of resultant forces of the passive soil pressures $E_{pxi}$ of all the soil layers i outside the steel cylinder at the land side below the rotation point O is the passive soil pressure Pp1, and a sum of resultant forces of the passive soil pressures $E_{pxi}$ of all the soil layers i outside the steel cylinder at the seaward side above the rotation point O is the passive soil pressure Pp2.

In some embodiments of the present disclosure, the active and passive soil pressures on the outside of a steel cylinder may be determined quickly and accurately based on the Rankin theory, which facilitates a subsequent prediction of the stability of the steel cylinder against tilt.

Step 3, determining a filler pressure inside the steel cylinder.

A filler pressure refers to a pressure of a filler inside the steel cylinder against an inner wall of the cylinder. A filler refers to a material filled in the steel cylinder.

3.1: dividing an interior of the steel cylinder into three sections from top to bottom, and the three sections include an AB section, a BC section, and a CD section.

Figure 3:
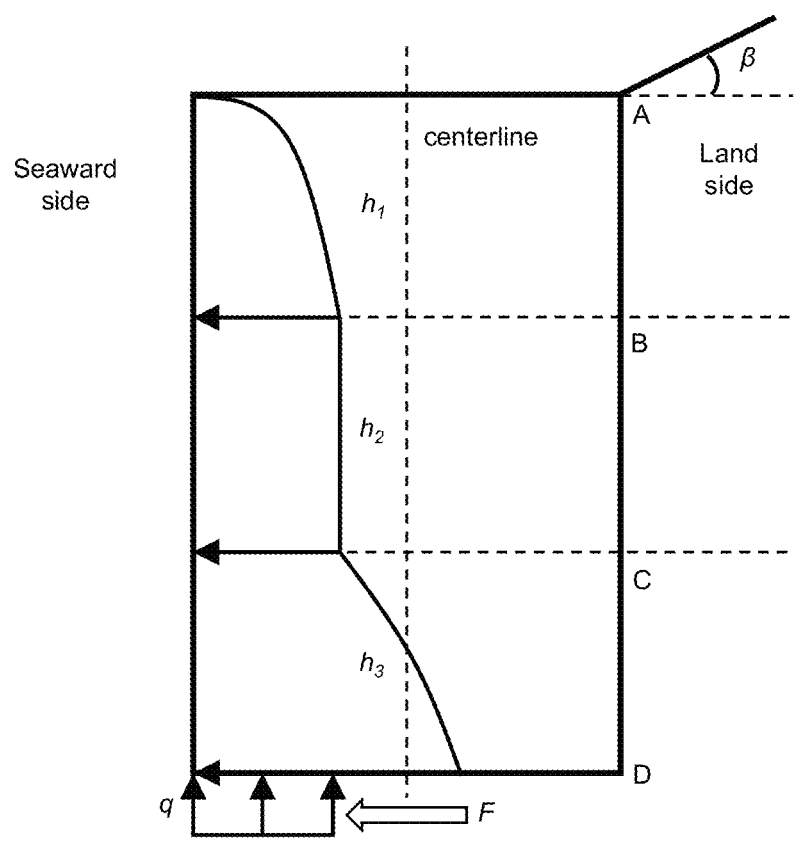
FIG. 3 is a schematic diagram illustrating force-bearings of an inside and a bottom of a steel cylinder according to some embodiments of the present disclosure.

FIG. 3 is a schematic diagram illustrating force-bearings of an inside and a bottom of a steel cylinder according to some embodiments of the present disclosure. Referring to FIG. 3, points A and D may be a top and a bottom of the steel cylinder, respectively.

A height of the AB section may be denoted as $$h_1 = D_0 \cdot \tan\left(45 + \frac{\varphi}{2} - \delta\right).$$

A height of the CD section may be denoted as $$h_3 = D_0 \cdot \tan\left(45 - \frac{\varphi}{2}\right).$$

A height of the BC section may be denoted as $h_2 = H - h_1 - h_3$.

wherein $\phi$ denotes a friction angle of the filler inside the steel cylinder; $\delta$ denotes a friction angle between the steel cylinder and the filler, $D_0$ denotes a diameter of the steel cylinder, and H denotes a height of the steel cylinder.

3.2: determining the filler pressure in the section AB:

A vertical pressure $\sigma_y$ of the filler inside the steel cylinder may be denoted as $\sigma_y = \gamma A m + q_0 e^{-y/A}$, $$A = \frac{D_0}{4K}$$

$$K = \lambda_0 \tan(\delta)$$

Wherein $\gamma$ denotes a volume weight (kN/m$^3$) of the filler inside the steel cylinder, $m = 1 - e^{-y/A}$, y denotes a calculated depth (m), e denotes a natural logarithm, $q_0$ denotes an external load, and A denotes a parameter to be determined.

$$\lambda_0 = \frac{1}{1 + 2\tan\phi\tan\delta + 2\sqrt{(\tan^2\phi + 1)(\tan\phi\tan\delta - \tan^2\delta)}},$$

wherein $\lambda_0$ denotes a thrust coefficient at a side of the filler;

A horizontal pressure $\sigma_x$ of the filler against an inner wall of the AB section of the steel cylinder is denoted as $\sigma_x = \lambda_0 \sigma_y$.

In some embodiments, the processor may determine a variation pressure of the AB section as a linear variation. The processor may simply calculate the filler pressure $\sigma_{Bx}$ at point B based on the formula $\sigma_x = \lambda_0 \sigma_y$, with the filler pressure at point A being set to be 0.

In some embodiments of the present disclosure, the calculation may be simplified and an efficiency of determining the filler pressure may be improved by determining the variation of the filler pressure in the AB section as the linear variation.

3.3: determining the filler pressure in the BC section:

The filler pressure in the BC section may be considered to be equal pressure, a filler pressure $\sigma_{Bx}$ at the point B may be calculated according to the formula $\sigma_x = \lambda_0 \sigma_y$ in step 3.2, and the filler pressure at another position of the BC section may be equal to the filler pressure $\sigma_{Bx}$ at the point B.

3.4: determining the filler pressure in the CD section:

The filler pressure in the CD section is in a linear variation. That is, in the CD section, a vertical coordinate may be the depth, and a horizontal coordinate may be a magnitude of the filler pressure, and the two coordinates may be in a linear relation. Therefore, by determining the magnitudes of the filler pressures at point C and point D, a linear formular (i.e., two points determines a line) for the variation of filler pressure with the depth of the CD section may be determined.

The filler pressure $\sigma_{Cx}$ at the point C may be equal to the filler pressure $\sigma_{Bx}$ at the point B.

The filler pressure at the point D of the bottom of the steel cylinder may be calculated based on an average pressure $\sigma$ mid at the bottom of the steel cylinder, and according to an analysis of the available experimental data, the filler pressure at the point D may be calculated using the following formula:

$$\sigma_{Dx} = \lambda_0(\sigma_{mid} - \sigma_x),$$

wherein $\sigma$ mid denotes the average pressure at the bottom of the steel cylinder.

Step 4: determining an external friction t2 and an internal friction t1 of the steel cylinder when the steel cylinder is tilted to the seaward side, respectively.

The external friction t2 refers to the friction of the soil body outside the steel cylinder on the steel cylinder. The internal friction t1 refers to the friction of the filler inside the steel cylinder on the steel cylinder.

4.1: determining a friction between the soil layer and an exterior of the steel cylinder.

The friction between the soil layer i and the exterior of the steel cylinder is denoted as $E_{yi}=\tan(\delta_i)\cdot E_{axi}$ or $E_{yi}=\tan(\delta_i)\cdot E_{pxi}$.

The above formular depends on whether the soil layer i is involved in an active soil pressure calculation or a passive soil pressure calculation. In response to determining that the soil layer i is involved in the active soil pressure calculation, $E_{yi}=\tan(\delta_i)\cdot E_{axi}$, and in response to determining that the soil layer i is involved in the passive soil pressure calculation, $E_{yi}=\tan(\delta_i)\cdot E_{pxi}$.

4.2: determining a friction between the filler and the interior of the steel cylinder.

For the interior of the steel cylinder, a friction that the AB section is subjected to may be denoted as $E_{yt1AB}$ $\tan(\delta)\cdot\sigma_{Bx}\cdot h_1\cdot 0.5$.

For the interior of the steel cylinder, a friction that the BC section is subjected to may be denoted as $E_{yt1BC}$ $\tan(\delta)\cdot\sigma_{Cx}\cdot h_2$.

For the interior of the steel cylinder, a friction that the CD section is subjected to may be denoted as $E_{yt1CD}=\tan(\delta)\cdot(\sigma_{Cx}+\sigma_{Dx})\cdot h_3\cdot 0.5$.

Step 5, determining a vertical reaction force and a horizontal resistance force of a foundation bed against the steel cylinder when the steel cylinder is tilted toward the seaward side, respectively.

A vertical reaction force refers to the reaction force generated by the foundation bed to the steel cylinder in a vertical direction. A horizontal reaction force refers to the reaction force generated by the foundation bed to the steel cylinder in a horizontal direction.

5.1: The vertical reaction force of the foundation bed on the steel cylinder.

An average pressure of the vertical reaction force of the foundation bed against the steel cylinder is denoted as $q=9\cdot C_u$, wherein $C_u$ denotes an undrained shear strength of a foundation soil body. The vertical reaction force of the foundation bed against the steel cylinder may be denoted as $F_q=q*L_q$, wherein $L_q$ denotes a distance $L_q$ between the rotation point and the tilt side (the seaward side). In some embodiments, the processor may calculate the $L_q$ based on coordinates of the rotation point and a diameter of the steel cylinder.

5.2: The horizontal resistance force of the foundation bed against the steel cylinder.

In some embodiments, the horizontal resistance force F of the foundation bed against the steel cylinder may be determined based on the following formular.

$$F = \pi/4 \cdot D_0 \cdot D_0 \cdot C_u$$

Step 6, determining an anti-tilt moment $M_r$ and a tilt moment $M_s$ when the steel cylinder is tilted to the seaward side.

An anti-tilt moment $M_r$ refers to the moment generated by a gravity of the steel cylinder.

A tilt moment $M_s$ refers to the moment generated by a distance between a force-bearing point and a center of gravity of the steel cylinder when the cylinder is subjected to the external force.

The anti-tilt moment $M_r$ and the tilt moment $M_s$, when the steel cylinder is tilted to the seaward side, may be determined by the following formular.

$$M_r = P_{p1}*|y_{p1} - R_{yi}| + P_{p2}*|y_{p2} - R_{yi}| +$$

$$\sum_{i=1}^{N}E_{yi}*|x_i - R_{xi}|(E_{yt1AB} + E_{yt1BC} + E_{yt1CD})*D_0/2 +$$

$$q*L_q*\frac{L_q}{2} + F*|y_F - R_{yi}|$$

$$M_s = P_{a1}*|y_{a1} - R_{yi}| + P_{a2}*|y_{a2} - R_{yi}|$$

Wherein $P_{p1}$ denotes a resultant force of the passive soil pressures at the land side, $y_{p1}$ denotes a y-coordinate of $P_{p1}$, $P_{p2}$ denotes a resultant force of the passive soil pressures at the seaward side, $y_{p2}$ denotes a y-coordinate of $P_{p2}$, N denotes a count of soil layers outside a cylinder body, $x_i$ denotes an x-coordinate of where $E_{yi}$ is located, q denotes an average pressure of the vertical reaction force of the foundation bed against the steel cylinder, $L_q$ denotes a distance from the rotation point to a tilted side, $y_F$ denotes a y-coordinate of the horizontal resistance force F of the foundation bed against the steel cylinder, $P_{a1}$ denotes a resultant force of the active soil pressures at the land side, $P_{a2}$ denotes a resultant force of the active soil pressures at the seaward side, $y_{a1}$ denotes a y-coordinate of $P_{a1}$, and $y_{a2}$ denotes a y-coordinate of $Pa_2$. It may be noted that, in the formula, the calculation of an external load is not included, and if there is an external load acting on the steel cylinder, the external loads Fx and Fy may be used to calculate and provide the anti-tilt moment or the or the tilt moment according to a moment direction.

The active soil pressures on the exterior of the steel cylinder may provide the tilt moment; the passive soil pressures, the vertical reaction force of the foundation bed against the steel cylinder, the horizontal resistance force of the foundation bed against the steel cylinder, the internal friction of the steel cylinder, and the external friction of the steel cylinder may provide the anti-tilt moment, and the external load may be used to calculate and provide, according to a moment direction, the anti-tilt moment or the tilt moment.

Step 7, determining a safety factor Kl for the steel cylinder tilting toward the seaward side.

A safety factor Kl refers to a data index of anti-tilt and maintaining stability when the steel cylinder is tilted to the seaward side. The higher the safety factor Kl is, the higher the stability of the steel cylinder is.

In some embodiments, the safety factor Kl for the steel cylinder tilting toward the seaward side may be determined by the following formula:

$$Kl = \frac{M_r}{M_s}$$

More descriptions of the anti-tilt moment $M_r$ and the tilt moment $M_s$ may be found in the related descriptions of step 6.

Step 8, at the same rotation point O, in response to determining that the steel cylinder rotates toward the land side, the safety factor Kr for the steel cylinder tilting toward the land side may be determined according to steps 2 to 7 above.

In some embodiments, the processor may determine that the steel cylinder is rotated to the land side when the resultant force applied to the steel cylinder is pointing to the land side in the horizontal direction.

A safety factor Kr refers to a data index of anti-tilt and maintaining stability when the steel cylinder is tilted to the land side. The higher the safety coefficient Kr is, the higher the stability of the steel cylinder is.

Figure 4:
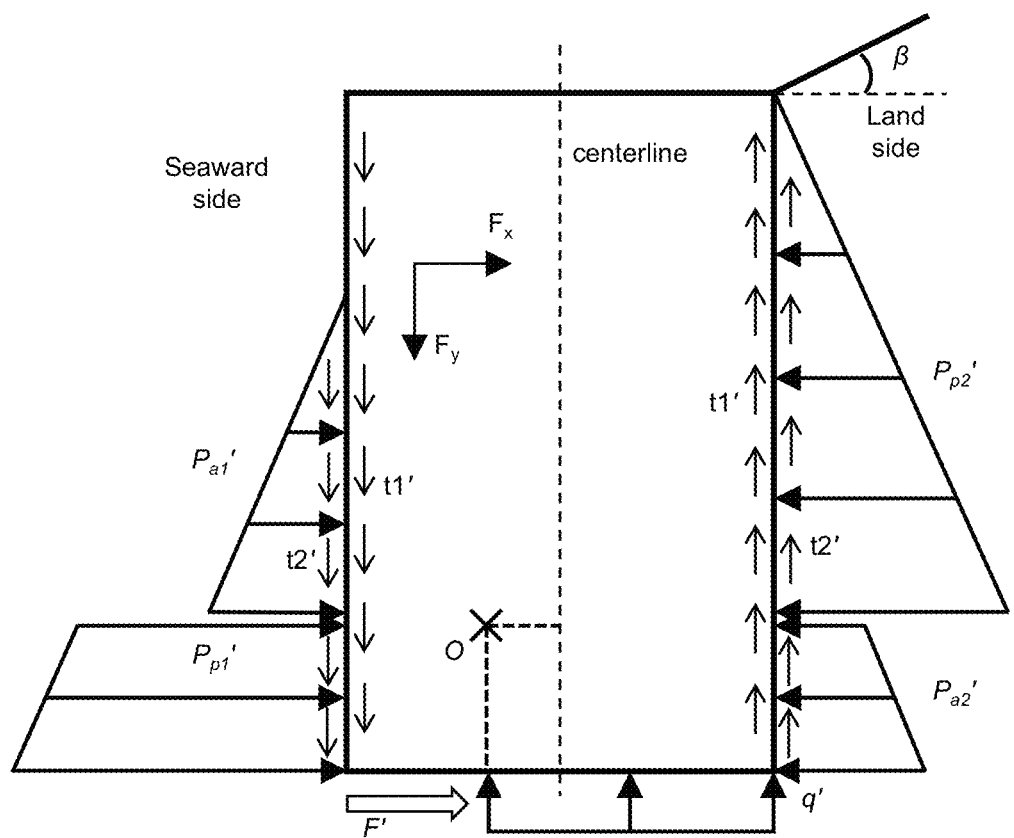
FIG. 4 is a schematic diagram illustrating a force-bearing of a steel cylinder tilting toward a land side under a limit state according to some embodiments of the present disclosure.

FIG. 4 is a schematic diagram illustrating a force-bearing of a steel cylinder tilting toward a land side under a limit state according to some embodiments of the present disclosure.

As shown in FIG. 4, at the same rotation point O, in response to determining that the steel cylinder rotates toward the land side, the soil body outside the steel cylinder at the seaward side above the rotation point O, and the soil body outside the steel cylinder at the land side below the rotation point O, are active soil pressures Pa1' and Pa2', respectively; and the soil body outside the steel cylinder at the seaward side below the rotation point O, and the soil body outside the steel cylinder at the land side above the rotation point O, are passive soil pressures Pp1' and Pp2', respectively.

In some embodiments, under a condition that the steel cylinder rotates to the land side, the active soil pressures Pa1' and Pa2' outside the steel cylinder, the passive soil pressures Pp1' and Pp2' outside the steel cylinder, the vertical reaction force q' of the foundation bed against the steel cylinder, the horizontal resistance force F' of the foundation bed against the steel cylinder, the internal friction t1' of the steel cylinder, and the external friction t2' of the steel cylinder may be re-determined according to steps 2-7 above.

In some embodiments, the processor may determine an anti-tilt moment and a tilt moment under a condition that the steel cylinder is tilted toward the land side based on the method of steps 6 and 7 above, and determine a safety factor Kr for the steel cylinder tilting landward the land side.

Step 9, comparing Kl and Kr, and taking a smaller value of Kl and Kr as a safety factor $F_i$ below the rotation point O.

Step 10, re-selecting a new rotation point, determining a safety factor corresponding to the new rotation point according to steps 2 to 9 above, and taking a safety factor with a smallest value among all rotation points as a final safety factor $F_{min}$ under a working condition.

In some embodiments, the processor may select rotation points based on an evaluation order of target rotation points. For example, the processor may determine a selecting order of the target rotation points based on the evaluation order. For more descriptions of the target rotation points and the evaluation order, please refer to FIG. 6 and the related description.

Step 11, determining a stability monitoring parameter based on the final safety factor $F_{min}$, and generating an anti-tilt instruction; sending the stability monitoring parameter to a stability monitoring device, sending an early warning instruction to a playback device, and sending a reinforcing parameter instruction to a reinforcing device corresponding to a weak point.

A stability monitoring parameter refers to a parameter associated with monitoring performed by a stability monitoring device. For example, the stability monitoring parameter may include a monitoring frequency of the stability monitoring device.

A stability monitoring device refers to a device for monitoring the tilt stability of a steel cylinder. For example, the monitoring device may include a vibration sensor, a verticality gauge, a laser ranging sensor, etc. For example, the vibration sensor may be used to monitor a vibration of a region near the steel cylinder; the verticality gauge may be used to monitor a verticality of the steel cylinder; and the laser ranging sensor may be used to monitor a displacement of the steel cylinder.

In some embodiments, the processor may determine the stability monitoring parameter based on the final safety factor $F_{min}$ in a variety of ways. For example, the processor may query a preset table to determine the stability monitoring parameter based on the final safety factor $F_{min}$. The preset table may include different correspondences between the final safety factors $F_{min}$ and the stability monitoring parameters. The preset table may be determined based on historical experience. An exemplary correspondence may be that the lower the final safety factor $F_{min}$ is, the higher the stability monitoring parameter is.

An anti-tilt instruction refers to an instruction for preventing a steel cylinder from being tilted. In some embodiments, the anti-tilt instruction may include an early warning instruction and a reinforcing parameter instruction.

An early warning instruction refers to an instruction that provides an early warning for the stability of the steel cylinder against tilt. The warning instruction may include a text or a speech related to the stability warning. A color and content of text, a volume and rapidity of speech corresponding to different early warning instructions may be different.

In some embodiments, the processor may generate the early warning instruction based on the final safety factor $F_{min}$. For example, the lower the final safety factor $F_{min}$ is, the darker the color of the text corresponding to the warning instruction is, the louder the volume of the speech is, and the more rapid the speech is.

A reinforcing parameter instruction refers to an instruction related to the reinforcing of a steel cylinder.

Figure 5:
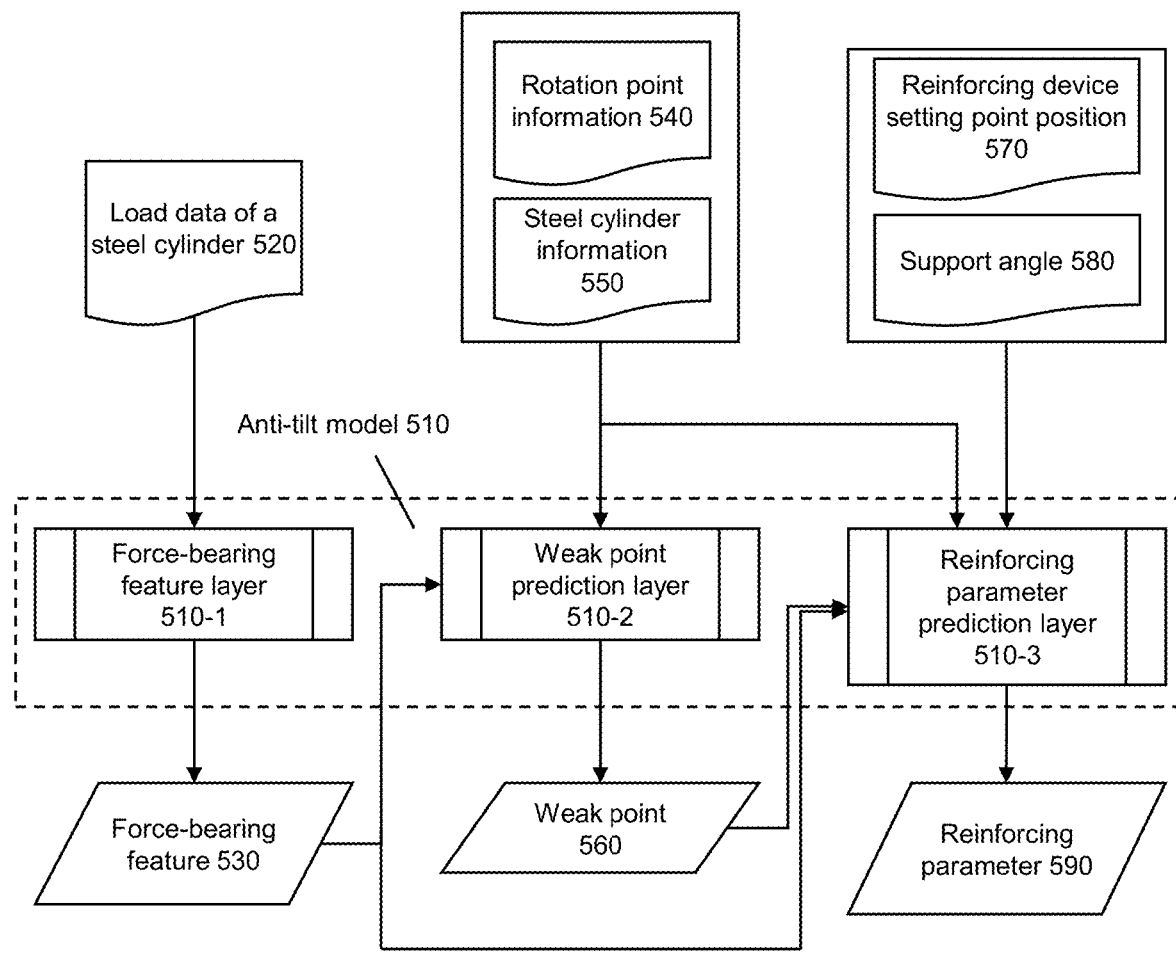
FIG. 5 is a schematic diagram illustrating an anti-tilt model according to embodiments of the present disclosure.

For the descriptions of the determination of the reinforcing parameter instruction, please refer to FIG. 5 and the related descriptions thereof.

A playback device refers to a device or component used to playback the warning instruction. In some embodiments, the playback device may include a display playback device (e.g., a display) and a sound playback device (e.g., a speaker). When the warning instruction is the text, the processor may send the warning instruction to the display playback device; and when the warning instruction is a speech, the processor may send the warning instruction to the sound playback device.

A reinforcing device refers to a device for reinforcing the steel cylinder. For example, the reinforcing device may include a hydraulic support device. In some embodiments, the reinforcing device may be provided around a circumference of the steel cylinder, and may also be provided at a key point position. For more descriptions of the key point position, please refer to FIG. 6 and the related descriptions thereof.

In some embodiments, the processor may send the stability monitoring parameter to the stability monitoring device, send the warning instruction to the playback device, and send the reinforcing parameter instruction to the reinforcing device corresponding to the weak point based on a wired or wireless connection. The weak point refers to a position in the steel cylinder that is prone to failure (e.g., a deformation, a displacement, a damage, etc.).

In some embodiments of the present disclosure, by obtaining the stability monitory parameter through determining the final safety factor $F_{min}$, and by sending the anti-tilt instruction generated to the corresponding device, accurate prediction results may be obtained for the stability of the steel cylinder against tilt under a variety of working conditions and at any rotation point, which helps to provide a timely warning to the user and carry out reinforcing operations to avoid incalculable losses caused by a collapse of steel cylinders.

It should be noted that the foregoing descriptions of the process is intended to be exemplary and illustrative only and does not limit the scope of application of the present disclosure. For those skilled in the art, various corrections and changes may be made to the process under the guidance of this disclosure. However, these corrections and changes remain within the scope of this disclosure.

In some embodiments, the processor may analyze water level line fluctuation information based on a water level line information sequence, adjust, based on the water level line fluctuation information, a collection frequency of the water level sensor, and determine, based on the water level line information collected at the adjusted collection frequency, the final safety factor $F_{min}$.

A water level line information sequence refers to a water level line information sequence composed in a time order. In some embodiments, the water level line information sequence may include the water level line information and a collection time of the water level line information, etc. For more descriptions of the water level line information, please refer to FIG. 1 and the related descriptions thereof.

In some embodiments, the processor may obtain the water level line information at a plurality of moments through the water level sensor, and arrange the water level line information in an order of the collection time of the water level line information to obtain the water level line information sequence.

Water level line fluctuation information refers to information related to a water level line fluctuation in the environment in which the steel cylinder is buried. For example, the water level line fluctuation information may include a magnitude of the water level line fluctuation.

In some embodiments, the processor may obtain the water level line fluctuation information by analyzing the water level line information sequence. For example, the processor may calculate a variation speed of the water level line during a time period between any two time points (e.g., two adjacent time points) to obtain the water level line fluctuation information. Exemplarily, the water level line fluctuation information may be 10 centimeters/hour for a time period when the water level has changed by 40 centimeters from 10:00 am to 2:00 pm.

A collection frequency refers to a frequency at which the water level sensor collects the water level line information.

In some embodiments, the processor may adjust the collection frequency of the water level sensor based on the water level line fluctuation information. For example, the processor may adjust the collection frequency of the water level sensor when the water level line fluctuation information exceeds a preset value. The preset value may be preset by manually based on the historical experience.

In some embodiments, the processor may predict the safety factors of a plurality of time periods based on the water level line information collected according to the adjusted collection frequency by the method of steps 2-10.

In some embodiments, the processor may determine the smallest safety factors of the plurality of safety factors for the plurality of time periods as the final safety factor $F_{min}$.

The water level line of the environment in which the steel cylinder is buried may be fluctuated and varied, and the fluctuation of the water level may affect a force-bearing balance of the steel cylinder. When the water level is fluctuated considerably, the force-bearing on the steel cylinder may be varied considerably within a short time period, so that the previously determined safety factor may be no longer applicable. In some embodiments of the present disclosure, by re-determining the safety factor based on the latest water level line information, the final safety factor for the current working condition may be re-determined in time based on the information of the water level line fluctuation, which helps to ensure a steel cylinder stability during construction.

FIG. 5 is a schematic diagram illustrating an anti-tilt model according to embodiments of the present disclosure.

In some embodiments, in response to determining that the final safety factor $F_{min}$ is lower than a preset safety value, a processor may determine, based on load data 520 of a steel cylinder, rotation point information 540 corresponding to the final safety factor $F_{min}$, a weak point 560, and a reinforcing parameter 590 through an anti-tilt model 510. The weak point and the reinforcing parameter may be taken as a reinforcing parameter instruction. For more descriptions of the final safety factor $F_{min}$, the reinforcing parameter instruction, and the weak point, please refer to FIG. 1 and the related descriptions thereof.

A preset safety value refers to a threshold value used to determine whether the stability of the steel cylinder is safe. If the final safety factor $F_{min}$ is higher than the preset safety value, it indicates that the steel cylinder is safe and there is no risk of tilt. On the contrary, if the final safety factor $F_{min}$ is lower than the preset safety value, it indicates that the steel cylinder is less safe and there is a risk of tilt. In some embodiments, the preset safety value may be determined based on a theoretical calculation or the historical experience.

An anti-tilt model refers to a model used to determine the weak point and the reinforcing parameter. In some embodiments, the anti-tilt model may be a machine learning model, such as a neural network (NN) model, etc.

In some embodiments, an input to the anti-tilt model 510 may include the load data 520 of the steel cylinder, the rotation point information 540 corresponding to the final safety factor $F_{min}$, the steel cylinder information 550, the reinforcing device setting point position 570, and a support angle 580; and an output may include the weak point 560 and the reinforcing parameters 590.

The load data 520 of the steel cylinder refers to data related to a force-bearing and a moment of the steel cylinder. For example, the load data of the steel cylinder may include an active soil pressure, a passive soil pressure, a filler pressure, an external soil layer friction, a vertical resistance, an external friction, and an internal friction, as determined in steps 2-6, etc.

Rotation point information refers to information related to the rotation point. For example, the rotation point information may include a spatial coordinate, a position, and a type of the rotation point (e.g., a theoretical rotation point, a key point position, etc.). For more descriptions about the rotation point, please refer to FIG. 1 and FIG. 6, and the related descriptions thereof.

The steel cylinder information 550 refers to information related to the steel cylinder. For example, the steel cylinder information may include a material, a size, a structure, etc., of the steel cylinder.

The reinforcing device setting point position 570 refers to a position of a reinforcing device point.

The support angle 580 refers to an angle at which the reinforcing device is configured to support the steel cylinder.

In some embodiments, the processor may obtain the load data of the steel cylinder, the rotation point information, the steel cylinder information, the reinforcing device setting point position, and the support angle based on a memory.

The reinforcing parameter 590 refers to a parameter related to a reinforcing of the steel cylinder by the reinforcing device, such as an output pressure of the reinforcing device, a load applied to the steel cylinder by the reinforcing device, etc.

In some embodiments, the anti-tilt model 510 may include a force-bearing feature layer 510-1, a weak point prediction layer 510-2, and a reinforcing parameter prediction layer 510-3.

The force-bearing feature layer 510-1 may be a machine learning model, such as an NN model, etc. In some embodiments, an input of the force-bearing feature layer 510-1 may include the load data 520 of the steel cylinder, and an output of the force-bearing feature layer 510-1 may be a force-bearing feature 530. The force-bearing feature 530 refers to a feature associated with the force-bearing of the steel cylinder. For example, the force-bearing feature may include a magnitude, a direction, etc., of a resultant force applied to the steel cylinder.

The weak point prediction layer 510-2 may be a machine learning model, such as an NN model, etc. An input of the weak point prediction layer 510-2 may include the force-bearing feature 530, the rotation point information 540 corresponding to the final safety factor $F_{min}$, and the steel cylinder information 550, and an output of the weak point prediction layer 510-2 may be the weak point 560.

The reinforcing parameter prediction layer 510-3 may be a machine learning model, such as an NN model, etc. An input of the reinforcing parameter prediction layer 510-3 may include the force-bearing feature 530, the rotation point information 540 corresponding to the final safety factor $F_{min}$, the steel cylinder information 550, the weak point 560, the reinforcing device setting point position 570 and the support angle 580, and an output of the reinforcing parameter prediction layer 510-3 may be the reinforcing parameter 590.

In some embodiments, the processor may obtain the anti-tilt model by joint training based on a first training sample with a first label.

Each group of training samples of the first training sample may include the load data of a sample steel cylinder, sample rotation point information, sample steel cylinder information, sample reinforcing device setting point position, and sample support angle.

A first label may include a sample weak point and a sample reinforcing parameter corresponding to the first training sample. In some embodiments, the first label and the first training sample may be obtained based on historical data. The processor may identify one or more points in the historical data where the steel cylinder actually deforms, rotates, displaces, or damages, which results in the tilt and destruction of the steel cylinder, as the sample weak point in the first label. The processor may identify an actual reinforcing parameter corresponding to the historical data in which the steel cylinder does not undergo a tilt damage after the steel cylinder is reinforced as the sample reinforcing parameter in the first label.

A process of the joint training may include: inputting the load data of the sample steel cylinder into the force-bearing feature layer of an initial anti-tilt model, and obtaining the force-bearing feature output from the force-bearing feature layer; inputting the force-bearing feature, the sample rotation point information, the sample steel cylinder information output into the weak point prediction layer, and outputting the weak point; inputting the weak point output, the force-bearing feature, the sample rotation point information, the sample steel cylinder information, the sample reinforcing device setting point position, and the sample support angle into the reinforcing parameter prediction model, and outputting the reinforcing parameter; constructing a first loss function by combining the sample weak point in the first label and the output of the weak point prediction layer, and constructing a second loss function by combining the sample reinforcing parameter in the first label and the output of the reinforcing parameter prediction layer. Parameters of the force-bearing feature layer and the weak point prediction layer may be iteratively updated based on the first loss function, and the parameter of the reinforcing parameter prediction layer may be iteratively updated based on the second loss function until conditions such as the first loss function and the second loss function being less than a threshold value or being converged, or a training period reaching a threshold are met, and a trained anti-tilt model may be obtained.

In some embodiments of this disclosure, by determining the weak point and the reinforcing parameter based on the anti-tilt model, and dividing the anti-tilt model into different layers for data processing, an accuracy and efficiency of a quality of the reinforcing parameter may be improved, and a stability of the steel cylinder may be ensured.

Figure 6:
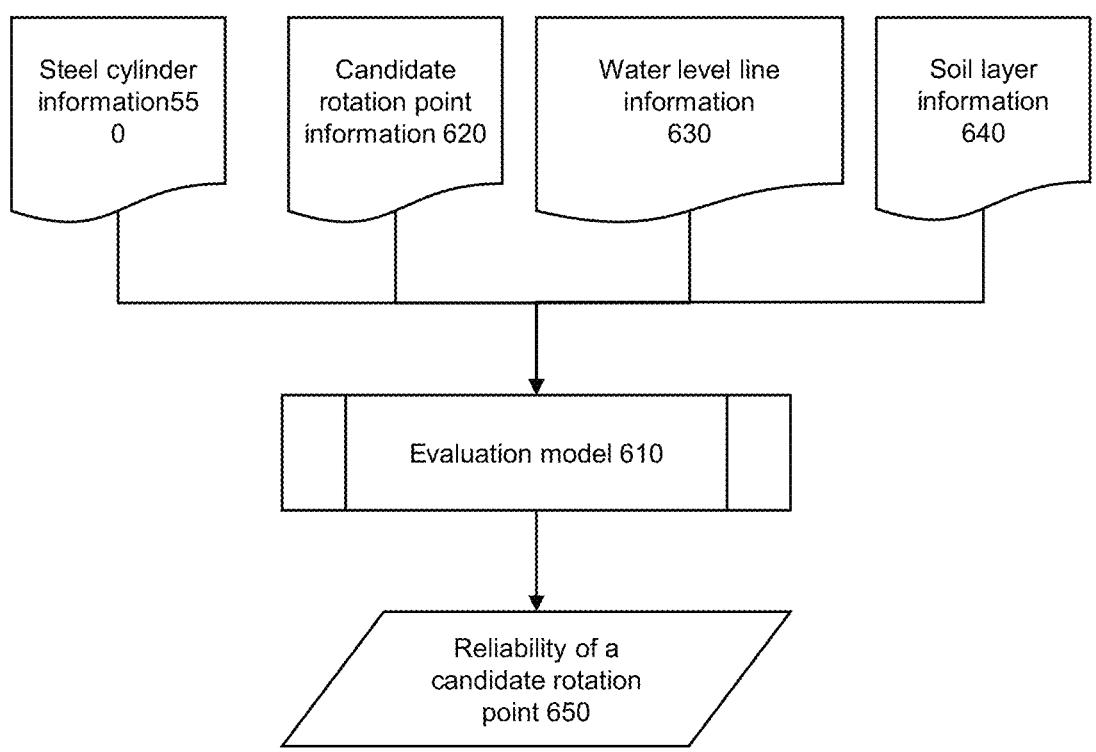
FIG. 6 is a schematic diagram illustrating an evaluation model according to some embodiments of the present disclosure.

FIG. 6 is a schematic diagram illustrating an evaluation model shown according to some embodiments of the present disclosure.

In some embodiments, a processor may determine a candidate rotation point based on at least one of steel cylinder information and external load data, determine a reliability of the candidate rotation point through an evaluation model, and determine a target rotation point and an evaluation order based on the reliability of the candidate rotation point.

For more descriptions of the steel cylinder information, please refer to FIG. 5 and the related descriptions thereof, and for more descriptions of the external load data, please refer to FIG. 1 and the related descriptions thereof.

A candidate rotation point refers to a rotation point that is a candidate for a stability evaluation.

In some embodiments, the processor may determine a candidate rotation point based on at least one of the steel cylinder information and the external load data in various ways.

For example, the processor may determine a theoretical rotation point where a moment and a bending moment are 0 as the candidate rotation point through calculations based on the external load data. The processor may also determine a key point position of the steel cylinder as the candidate rotation point based on the steel cylinder information. A key point position may be a connection point (e.g., a weld point), a key support, etc. The processor may also determine a point that is subject to displacement and deformation as the candidate rotation point based on historical experience.

An evaluation model refers to a model used to evaluate the reliability of the candidate rotation point. The evaluation model may be a machine learning model, such as an NN model, etc.

A reliability of a candidate rotation point refers to a degree of reliability of the candidate rotation point. In some embodiments, the reliability of the candidate rotation point may be negatively correlated to a possibility of the displacement, the tilt, or the destruction of the candidate rotation point. The more likely the candidate rotation point is to be displaced, tilted, or destroyed, the less reliable the candidate rotation point is.

In some embodiments, an input of the evaluation model 610 may include the steel cylinder information 550, candidate rotation point information 620, water level line information 630, and soil layer information 640 of an environment in which the steel cylinder is buried, and an output of the evaluation model 610 may be a reliability of the candidate rotation point 650.

For more descriptions of the water level line information 630 and the soil layer information 640, please refer to FIG. 1 and the related descriptions thereof. The candidate rotation point information 620 refers to information related to the candidate rotation point, such as a coordinates, a type, etc., of the candidate rotation point.

In some embodiments, the processor may train the evaluation model based on a second training sample with a second label. For example, a plurality of second training samples with the second labels may be input into an initial evaluation model, a loss function may be constructed based on the second label and an output of the initial evaluation model, and parameters of the initial evaluation model may be iteratively updated based on the loss function by gradient descent or other manners, until the training is completed when preset conditions are met, and a trained evaluation model may be obtained. The preset conditions may be that the loss function converges, a number of iterations reaches a threshold, etc.

Each group of training samples of the second training sample may include the sample steel cylinder information, the sample rotation point information, the sample water level line information, and the sample soil layer information. In some embodiments, the second training sample may be obtained based on the historical data.

The second label may include the reliability of the sample rotation point. In some embodiments, the processor may determine the second label based on an actual stability of the steel cylinder during the construction process after determining the safety factor based on the sample rotation point. For example, after the safety factor is determined, the fewer cases of displacement, tilt, and damage of the steel cylinder is, the more reliable the sample rotation point corresponding to the second label is.

A target rotation point refers to the rotation point at which the safety factor needs to be determined. In some embodiments, the processor may determine the safety factors corresponding to the target rotation points in sequence according to a certain evaluation sequence.

In some embodiments, the processor may select the candidate rotation points with the reliabilities higher than a preset threshold as the target rotation points. In some embodiments, the processor may determine the sequence of reliability of the target rotation points from high to low as the evaluation sequence of the target rotation points.

In some embodiments of the present disclosure, by determining the reliabilities of the candidate rotation points through the evaluation model, and then determining the target rotation points and the evaluation sequence, a prioritized selection of the target rotation points with a high degree of reliability for the safety evaluation during the process of determining the final safety factor and evaluation may be ensured, thereby avoiding blindly selecting a great number of rotation points for calculation, and improving calculation accuracy and efficiency.

Embodiment 2

This embodiment differs from the Embodiment 1 in that step 2 in Embodiment 1 calculates the active soil pressure and the passive soil pressure outside the steel cylinder by using Rankin theory under the conditions that the buried soil of the steel cylinder is a cohesionless soil and the a slope surface of filled soil at the land side is horizontal ($\beta=0$), while this embodiment provides an alternative implementation of Step 2: the active soil pressure and the passive soil pressure outside the steel cylinder may be calculated by using a generalized limiting equilibrium theory under the conditions that the buried soil of the steel cylinder is an arbitrary soil (i.e., either cohesive force C=0 or cohesive force C!=0) and that slope surface of filled soil at the land side is horizontal ($\beta=0$), and the generalized limit equilibrium theory may be used to calculate the active soil pressure and the passive soil pressure outside the steel cylinder.

2.1 Calculating the active soil pressure $$e_{axi1} = q \cdot K_{qi} - C_i \cdot K_{ci} + \sum_1^{i-1} \gamma_i h_i \cdot K_{yi} \quad (1)$$

$$e_{axi2} = q \cdot K_{qi} - C_i \cdot K_{ci} + \sum_1^{i-1} \gamma_i h_i \cdot K_{yi} \quad (2)$$

$$E_{axi} = \frac{e_{axi1} + e_{axi2}}{2} h_i \quad (3)$$

$$K_{qi} = A_q[(1+\lambda^2)s_1^2 + (1+s_1\lambda)^2] \quad (4)$$

$$K_{ci} = (K_{qi} - 1)\lambda \quad (5)$$

$$K_{yi} = A_\gamma[(1+\lambda^2)s_1^2 + (1+s_1\lambda)^2] \quad (6)$$

$$\lambda = \tan(\varphi_i) \quad (7)$$

$$A_q = \frac{1+s_0^2}{2(1+\lambda^2)(1+s_1^2)} e^{2\lambda[atan(s_0)-atan(s_1)]} \quad (8)$$

$$A_\gamma = \frac{s_0}{s_0 - s_1}\left[\frac{1-3s_1\lambda}{(1+9\lambda^2)(1+s_1^2)} + A - \frac{s_1}{s_0}A_q\right] \quad (9)$$

$$A = \frac{2\lambda(s_0+\lambda)}{(1+9\lambda^2)(1+\lambda^2)}\sqrt{\frac{1+s_0^2}{1+s_1^2}} e^{3\lambda[atan(s_0)-atan(s_1)]} \quad (10)$$

$$s_0 = \lambda - \sqrt{(1+\lambda^2)} \quad (11)$$

$$s_1 = \frac{\lambda[\lambda - \tan(\delta)] - \sqrt{(1+\lambda^2)(\lambda^2 - \tan^2(\delta))}}{\lambda(1+\lambda\tan(\delta)) + (1+\lambda^2)\tan(\delta)} \quad (12)$$

wherein $C_i$ denotes the cohesive force of a soil layer i; $\phi_i$ denotes a friction angle of the soil layer i; $\delta$ denotes the friction angle between the steel cylinder and the soil; $h_i$ denotes a thickness of the soil layer i, $\gamma_i$ denotes a volume weight of the soil layer i. A natural volume weight may be used for the soil above the water level, and a floating volume weight may be used for the soil below the water level, q denotes a surface uniform load; $K_{qi}$ denotes a surface load earth pressure coefficient of the soil layer i; $K_{ci}$ denotes the cohesion soil pressure factor of the soil layer i; $K_{yi}$ denotes a soil pressure factor of a self-weight load of the soil layer i; $e_{axi1}$ denotes the active soil pressure at a top of soil layer i; $e_{axi2}$ denotes the active soil pressure at a bottom of the soil layer i; $E_{axi}$ denotes a resultant force of the active soil pressure of the soil layer i; $s_0$, $s_1$, $\lambda$, $A_q$, $A_\gamma$, and A denote parameters to be determined.

2.2 Calculating the passive soil pressure $$e_{pxi1} = q \cdot K_{qi} - C_i \cdot K_{ci} + \sum_{1}^{i-1} \gamma_i h_i \cdot K_{yi} \quad (13)$$

$$e_{pxi2} = q \cdot K_{qi} - C_i \cdot K_{ci} + \sum_{1}^{i-1} \gamma_i h_i \cdot K_{yi} \quad (14)$$

$$E_{pxi} = \frac{e_{pxi1} + e_{pxi2}}{2} h_i \quad (15)$$

Wherein $e_{pxi}$ denotes a top passive soil pressure of the soil layer i; $e_{pxi2}$ denotes a bottom passive soil pressure of the soil layer i; and $E_{pxi}$ denotes a resultant force of the passive soil pressure of the soil layer i. The factors in formulas (13) and (14) for calculating the passive soil pressure may be calculated according to formulas (4) to (10), while the coefficients $s_0$ and $s_1$ may be calculated according to formulas (16) and (17) below, respectively.

$$s_0 = \lambda + \sqrt{(1+\lambda^2)} \quad (16)$$

$$s_1 = \frac{\lambda[\lambda - \tan(\delta)] + \sqrt{(1+\lambda^2)(\lambda^2 - \tan^2(\delta))}}{\lambda(1+\lambda\tan(\delta)) + (1+\lambda^2)\tan(\delta)} \quad (17)$$

In some embodiments of the present disclosure, the method of calculating the active and passive soil pressures outside the steel cylinder by means of the generalized limit equilibrium theory may be applied to the buried soil of the steel cylinder of any soil body, which helps to predict the stability of the steel cylinder against tilt in a variety of working conditions.

The basic concepts have been described above, and it is apparent to those skilled in the art that the foregoing detailed disclosure serves only as an example and does not constitute a limitation of the present disclosure. While not expressly stated herein, those skilled in the art may make various modifications, improvements, and amendments to this disclosure. These modifications, improvements, and amendments are suggested in the present disclosure, so these modifications, improvements, and amendments remain within the spirit and scope of the exemplary embodiments of the present disclosure.

Also, the present disclosure uses specific words to describe the embodiments of the present disclosure. For example, "an embodiment", "one embodiment", and/or "some embodiments" refers to a feature, structure, or characteristic associated with at least one embodiment of the present disclosure. Accordingly, it should be emphasized and noted that the "an embodiment" or "one embodiment" or "an alternative embodiment" in different places in the present disclosure do not necessarily refer to the same embodiment. In addition, certain features, structures, or characteristics of one or more embodiments of the present disclosure may be suitably combined.

Furthermore, unless expressly stated in the claims, the order of the processing elements and sequences described herein, the use of numerical letters, or the use of other names are not intended to qualify the order of the processes and laminar flow hoods described herein. While some embodiments of the invention currently considered useful are discussed in the foregoing disclosure by way of various examples, it should be understood that such details serve only illustrative purposes, and that additional claims are not limited to the embodiments disclosed, rather, the claims are intended to cover all amendments and equivalent combinations that are consistent with the substance and scope of the embodiments of the present disclosure. For example, although the implementation of various components described above may be embodied in a hardware device, they may also be implemented as a software only solution, e.g., an installation on an existing server or mobile device.

Similarly, it should be noted that in order to simplify the disclosure of the present disclosure and aid in the understanding of one or more embodiments of the present disclosure, the foregoing descriptions of embodiments of the present disclosure sometimes group multiple features together in a single embodiment, accompanying drawings, or a description thereof. However, the mode of disclosure does not imply that the objects of the present disclosure require more features than those mentioned in the claims. Rather, the claimed subject matter may lie in less than all the features of a single disclosed embodiment.

Some embodiments use numbers to describe the quantity of components and attributes, and it should be understood that such numbers, used in the description of an embodiment, are modified in some embodiments by the modifiers "about," "approximately," or "substantially." Unless otherwise noted, the terms "about," "approximately," or "substantially" indicate that a variation of ±20% in the stated number is allowed. Correspondingly, in some embodiments, the numerical parameters used in the present disclosure and the claims are approximations, which may vary depending on the desired features of individual embodiments. In some embodiments, the numerical parameters should consider the specified number of significant digits and employ general rounding practices. While the numerical ranges and parameters used to confirm a width of their ranges in some embodiments of the present disclosure are approximations, in specific embodiments, such values are set to be as precise as possible within a feasible range.

For each patent, patent application, patent application publication, and other material cited in the present disclosure, such as articles, books, manuals, publications, documents, etc., the entire contents of which are hereby incorporated by reference in their entirety. Except for application history documents that are inconsistent with or create a conflict with the contents of the present disclosure, and except for documents that limit the broadest scope of the claims of the present disclosure (currently or hereafter appended to the present disclosure). It should be noted that in the event of any inconsistency or conflict between the descriptions, definitions, and/or use of terminology in the materials appended to the present disclosure and those set forth in the present disclosure, the descriptions, definitions, and/or use of terminology in the present disclosure shall prevail.

Finally, it should be understood that the embodiments described in the present disclosure are only used to illustrate the principles of the embodiments of the present disclosure. Other deformations may also fall within the scope of the present disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A method for predicting a stability of a steel cylinder against tilt comprising:

Step 1, obtaining water level line information, soil layer information, and external load data of burial environment of the steel cylinder, the soil layer information including a thickness ($h_i$) of a soil layer, a density ($\gamma_i$) of the soil layer, a cohesive force ($C_i$) of the soil layer, a friction angle ($\varphi_i$) of the soil layer, and a friction coefficient ($\delta_1$) between a soil body and the steel cylinder;

Step 2: in response to determining that the steel cylinder is tilted towards a seaward side, assuming that a coordinate of a rotation point (O) at which the steel cylinder is tilted is ($R_{xi}$, $R_{yi}$), then a soil body outside the steel cylinder at a land side above the rotation point (O) and a soil body outside the steel cylinder at the seaward side below the rotation point (O), are active soil pressures (Pa1) and (Pa2) respectively, and a soil body outside the steel cylinder at the land side below the rotation point (O) and a soil body outside the steel cylinder at the seaward side above the rotation point (O), are passive soil pressures (Pp1) and (Pp2), respectively;

in response to determining that a burial soil of the steel cylinder is cohesionless soil and a slope surface of filled soil at the land side is horizontal, determining the active soil pressures and the passive soil pressures outside the steel cylinder by using Rankin theory;

Step 3: determining a filler pressure inside the steel cylinder, including:

3(i): dividing an interior of the steel cylinder into three sections from top to bottom, the three sections including an AB section, a BC section, and a CD section, respectively, wherein a height of the AB section is denoted as $$h_1 = D_0 \cdot \tan\left(45 + \frac{\varphi}{2} - \delta\right),$$

a height of the CD section is denoted as $$h_3 = D_0 \cdot \tan\left(45 - \frac{\varphi}{2}\right),$$

a height of the BC section is denoted as $h_2 = H - h_1 - h_3$, wherein, $\varphi$ denotes a friction angle of a filler inside the steel cylinder, $\delta$ denotes a friction angle between the steel cylinder and the filler, $D_0$ denotes a diameter of the steel cylinder;

3(ii): determining a filler pressure of the section AB, wherein a vertical pressure ($\sigma_y$) of the filler inside the steel cylinder is denoted as $\sigma_y = \gamma A m + q_0 e^{-y/A}$ $$A = \frac{D_0}{4K}$$

$$K = \lambda_0 \tan(\delta)$$

wherein $\gamma$ denotes a volume weight (kN/m³) of the filler inside the steel cylinder, $m = 1 - e^{-y/A}$, y denotes a calculated depth (m), e denotes a natural logarithm, $q_0$ denotes an external load, A denotes a parameter to be determined, and $$\lambda_0 = \frac{1}{1 + 2\tan\varphi\tan\delta + 2\sqrt{(\tan^2\varphi + 1)(\tan\varphi\tan\delta - \tan^2\delta)}},$$

wherein $\lambda_0$ denotes a thrust coefficient at a side of the filler; and a horizontal pressure ($\sigma_x$) of the filler against an inner wall of the AB section of the steel cylinder is denoted as $\sigma_x = \lambda_0 \sigma_y$;

3(iii): determining a filler pressure of the BC section, wherein the filler pressure of the BC section is considered to be equal pressure, a filler pressure ($\sigma_{Bx}$) at a point (B) is calculated according to the formula $\sigma_x = \lambda_0 \sigma_y$ in step 3.2, and a filler pressure at another position of the BC section is equal to the filler pressure ($\sigma_{Bx}$) at the point B;

3(iv): determining a filler pressure of the CD section, including:

determining filler pressures at a point (C) and a point (D), and obtaining a linear formular for a variation of the filler pressure of the CD section with a depth for the CD section, wherein the filler pressure at the point (C) is equal to the filler pressure ($\sigma_{Bx}$) at the point (B);

the filler pressure at the point (D) is calculated using the following formula: $\sigma_{Dx} = \lambda_0(\sigma_{mid} - \sigma_x)$, wherein $\sigma_{mid}$ is an average pressure at a bottom of the steel cylinder;

Step 4: determining an external friction (t2) and an internal friction (t1) of the steel cylinder when the steel cylinder is tilted to the seaward side, respectively, including:

4(i): determining a friction between the soil layer and an exterior of the steel cylinder, wherein a friction between the soil layer (i) and the exterior of the steel cylinder is denoted as $E_{yi} = \tan(\delta_i) \cdot E_{axi}$ or $E_{yi} = \tan(\delta_i) \cdot E_{pxi}$; and the above formula depends on whether the soil layer (i) is involved in an active soil pressure calculation or a passive soil pressure calculation, and in response to determining that the soil layer (i) is involved in the active soil pressure calculation, $E_{yi} = \tan(\delta_i) \cdot E_{axi}$, and in response to determining that the soil layer (i) is involved in the passive soil pressure calculation, $E_{yi} = \tan(\delta_i) \cdot E_{pxi}$;

4(ii): determining a friction between the filler and the interior of the steel cylinder, wherein for the interior of the steel cylinder, a friction that the AB section is subjected to is denoted as $E_{yt1AB} = \tan(\delta) \cdot \sigma_{Bx} \cdot h_1 \cdot 0.5$;

for the interior of the steel cylinder, a friction that the BC section is subjected to is denoted as $E_{yt1BC} = \tan(\delta) \cdot \sigma_{Cx} \cdot h_2$;

for the interior of the steel cylinder, a friction that the CD section is subjected to is denoted as $E_{yt1CD} = \tan(\delta) \cdot (\sigma_{Cx} + \sigma_{Dx}) \cdot h_3 \cdot 0.5$;

Step 5: determining a vertical reaction force and a horizontal resistance force of a foundation bed against the steel cylinder when the steel cylinder is tilted toward the seaward side, respectively;

Step 6: determining an anti-tilt moment ($M_r$) and a tilt moment ($M_s$) when the steel cylinder is tilted to the seaward side, wherein the active soil pressures on the exterior of the steel cylinder provides the tilt moment, the passive soil pressures, the vertical reaction force of the foundation bed against the steel cylinder, the horizontal resistance force of the foundation bed against the steel cylinder, the internal friction of the steel cylinder, and the external friction of the steel cylinder provide the anti-tilt moment, and the external load is used to calculate and provide, according to a moment direction, the anti-tilt moment or the tilt moment;

Step 7: determining a safety factor (Kl) for the steel cylinder tilting toward the seaward side, wherein $$Kl = \frac{M_r}{M_s};$$

Step 8: at the same rotation point (O), in response to determining that the steel cylinder rotates toward the land side, the soil body outside the steel cylinder at the seaward side above the rotation point (O), and the soil body outside the steel cylinder at the land side below the rotation point (O), are active soil pressures; and the soil body outside the steel cylinder at the seaward side below the rotation point (O), and the soil body outside the steel cylinder at the land side above the rotation point (O), are passive soil pressures, wherein under a condition that the steel cylinder rotates to the land side, the active soil pressures outside the steel cylinder, the passive soil pressures outside the steel cylinder, the vertical reaction force of the foundation bed against the steel cylinder, the horizontal resistance force of the foundation bed against the steel cylinder, the internal friction of the steel cylinder, and the external friction of the steel cylinder are re-determined according to steps above;

the anti-tilt moment and the tilt moment are determined under a condition that the steel cylinder is tilted toward the land side, and a safety factor (Kr) for of the steel cylinder tilting toward the land side is determined;

Step 9: comparing ($K_l$) and (Kr), and taking a smaller value of ($K_l$) and (Kr) as a safety factor ($F_i$) below the rotation point; and Step 10: re-selecting a new rotation point, determining a safety factor corresponding to the new rotation point according to steps above, and taking a safety factor with a smallest value among all rotation points as a final safety factor ($F_{min}$) under a working condition.

2. The method of claim 1, wherein the step 2 comprises:

2(i): determining the active soil pressures $$e_{axi1} = K_{axi} \sum_{1}^{i-1} \gamma_i h_i$$

$$e_{axi2} = K_{axi} \left( \sum_{1}^{i-1} \gamma_i h_i + \gamma_i h_i \right)$$

$$K_{axi} = \tan^2\left(45 - \frac{\varphi_i}{2}\right)$$

$$E_{axi} = \frac{e_{axi1} + e_{axi2}}{2} h_i$$

wherein $\varphi_i$ denotes the friction angle of the soil layer i, $\delta$ denotes the friction angle between the steel cylinder and the soil, $h_i$ denotes the thickness of the soil layer i, $\gamma_i$ denotes a volume weight of the soil layer i, a natural volume weight is used for soil above a water level, and a floating volume weight is used for soil below the water level, $K_{axi}$ denotes an active soil pressure coefficient of the soil layer i, $e_{axi1}$ denotes an active soil pressure at a top of the soil layer i, $e_{axi2}$ denotes an active soil pressure at a bottom of the soil layer i, $E_{axi}$ denotes a resultant force of the active soil pressures of the soil layer i, a sum of resultant forces of the active soil pressures $E_{axi}$ of all soil layers i outside the steel cylinder at the land side above the rotation point (O) is the active soil pressure (Pa1), and a sum of resultant forces of the active soil pressures $E_{axi}$ of all the soil layers i outside the steel cylinder at the seaward side below the rotation point (O) is the active soil pressure (Pa2);

2(ii): determining the passive soil pressures $$e_{pxi1} = K_{pxi} \sum_{1}^{i-1} \gamma_i h_i$$

$$e_{pxi2} = K_{pxi} \left( \sum_{1}^{i-1} \gamma_i h_i + \gamma_i h_i \right)$$

$$K_{pxi} = \tan^2\left(45 + \frac{\varphi_i}{2}\right)$$

$$E_{pxi} = \frac{e_{pxi1} + e_{pxi2}}{2} h_i$$

wherein $K_{pxi}$ denotes a passive soil pressure coefficient of the soil layer i, $e_{pxi1}$ denotes a passive soil pressure at the top of the soil layer i, $e_{pxi2}$ denotes a passive soil pressure at the bottom of the soil layer i, $E_{pxi}$ denotes a resultant force of the passive soil pressures of the soil layer i, a sum of resultant forces of the passive soil pressures $E_{pxi}$ of all the soil layers i outside the steel cylinder at the land side below the rotation point (O) is the passive soil pressure (Pp1), and a sum of resultant forces of the passive soil pressures ($E_{pxi}$) of all the soil layers i outside the steel cylinder at the seaward side above the rotation point (O) is the passive soil pressure (Pp2).

3. The method of claim 1, further comprising:

in step 3(ii), to simplify calculations, taking a variation of the filler pressure of the AB section as a linear variation, and calculating the filler pressure ($\sigma_{Bx}$) at the point B according to a formula $\sigma_x = \lambda_0 \sigma_y$, wherein a filler pressure at a point (A) is set to be 0.

4. The method of claim 1, wherein the step 5 comprises:

5(i): the vertical reaction force of the foundation bed against the steel cylinder, wherein the average pressure of the vertical reaction force of the foundation bed against the steel cylinder is denoted as $q=9 \cdot C_u$, wherein $C_u$ denotes an undrained shear strength of a foundation soil body, the vertical reaction force of the foundation bed against the steel cylinder is denoted as $F_q = q*L_q$, wherein $L_q$ denotes a distance $L_q$ between the rotation point and the tilt side, and $L_q$ is calculated based on coordinates of the rotation point and the diameter of the steel cylinder; and 5(ii): the horizontal resistance force of the foundation bed against the steel cylinder, wherein the horizontal resistance force of the foundation bed against the steel cylinder is denoted as $F = \pi/4 \cdot D_0 \cdot D_0 \cdot C_u$.

* * * * *